United States Patent
Kawashima

(10) Patent No.: US 6,534,172 B1
(45) Date of Patent: Mar. 18, 2003

(54) PRESSURE-SENSITIVE ADHESIVE TAPE AND PROCESS FOR PRODUCING THE SAME

(75) Inventor: Tadasu Kawashima, Tochiga (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/424,045

(22) PCT Filed: Mar. 15, 1999

(86) PCT No.: PCT/JP99/01243

§ 371 (c)(1),
(2), (4) Date: Nov. 18, 1999

(87) PCT Pub. No.: WO99/52987

PCT Pub. Date: Oct. 21, 1999

(30) Foreign Application Priority Data

Apr. 14, 1998 (JP) ............................................. 10-103097
Mar. 1, 1999 (JP) ............................................. 11-052425

(51) Int. Cl.[7] ............................... B32B 7/12; B05D 5/10
(52) U.S. Cl. .................... 428/343; 428/352; 428/353; 428/356; 427/207.1; 427/208.4; 427/290; 427/322
(58) Field of Search ................................. 428/343, 352, 428/353, 356; 427/207.1, 208.4, 290, 322

(56) References Cited

U.S. PATENT DOCUMENTS 5,039,569 A * 8/1991 Jones et al. .................. 428/141
5,489,474 A * 2/1996 Shinoda et al. .............. 428/343
5,851,662 A * 12/1998 Suzuki et al. ................ 428/352
6,110,983 A * 8/2000 Tokoro et al. ................ 521/56

FOREIGN PATENT DOCUMENTS

| JP | A 7-44104 | 2/1995 |
| JP | A 9-125016 | 5/1997 |
| JP | A 9-254328 | 9/1997 |

* cited by examiner

Primary Examiner—Terrel Morris
Assistant Examiner—Hai Vo
(74) Attorney, Agent, or Firm—Oliff & Berridge, PLC

(57) ABSTRACT

A technique for improving the adhesive force between a biodegradable base film and a rubbery adhesive layer.

An adhesive tape is obtained by rubbing the surface of a biodegradable film 9 by a means of rubbing 7 and then applying solution of ingredients of adhesive layer thereonto, thus forming an adhesive layer. The adhesion force between the base film and the adhesive layer is improved by the rubbing treatment. When the solution of ingredients of adhesive layer is an aqueous system, it is also possible that solution of ingredients of primer layer containing an organic compound as a solvent is applied onto the rubbed surface to thereby form a primer layer followed by the formation of the adhesive layer. The adhesive layer may contain fillers, coloring agents, age resistors, etc. so long as the biodegradability is not deteriorated thereby. It is preferable that a separate film to be bonded to the surface of the adhesive layer is also a biodegradable one.

21 Claims, 2 Drawing Sheets

PRESSURE-SENSITIVE ADHESIVE TAPE AND PROCESS FOR PRODUCING THE SAME

BACKGROUND OF THE INVENTION

1. Field of Invention

This invention pertains to the technical field of adhesive tapes. More particularly, it relates to an adhesive tape with the use of a biodegradable resin film.

2. Description of Related Art

There have been widely employed adhesive tapes comprising a base film and an adhesive layer formed thereon. When a separate film is to be bonded onto the adhesive layer, the adhesive force between the base film and the adhesive layer should exceed the adhesive force between the separate film and the adhesive layer. Therefore, techniques have been developed to improve the adhesive force between the base film and the adhesive layer by, for example, roughing the surface of the base film by sandblasting, etc., subjecting the base film to surface treatments such as corona discharge, or forming a primer layer on the base film and then forming an adhesive layer on the surface of the primer layer.

Various materials such as paper, plastic films, and metal foils are used for base films. When adhesive tapes are disposed by incineration, base films made of plastics sometimes evolve toxic gases, thus causing environmental pollution. When dumped into the ground, on the other hand, it is feared that plastic base films are not degraded and thus damage the ecological systems.

In recent years, therefore, attempts have been vigorously made to develop adhesive tapes with the use of biodegradable materials as the base or the separate film which are spontaneously degraded by microorganisms after disposal. Among these adhesive types, those wherein polylactic acid films are used as the base film have attracted public attention because of the excellent adhesiveness and strength thereof.

With respect to surface treatments to be carried out to elevate the adhesive strength to a polylactic acid film, corona discharge costs a great deal for the plant and equipment but can establish only insufficient effects, while the formation of an undercoating layer, such as a primer layer, etc., might deteriorate the biodegradability.

On the other hand, a cellophane tape comprising a base film made of cellophane, which is poor in moisture resistance, is usually produced in the following manner. Namely, a saran resin is applied to the both faces of the cellophane base to thereby improve the moisture resistance and then a primer layer is formed on one of the faces. Next, an adhesive layer is formed on the surface of the primer layer and the other face is subjected to a separation treatment followed by winding around, thereby giving a single-sided adhesive tape roll.

As discussed above, complicated processes are needed to produce single-sided tapes in the prior art.

An object of the present invention, which has been completed to solve the above-mentioned problems encountering in the prior art, is to provide a biodegradable adhesive tape. Another object of the present invention is to provide a technique for imparting opaque, colored and long-life characteristics to an adhesive tape without deteriorating the biodegradability thereof.

SUMMARY OF THE INVENTION

The present invention provides an adhesive tape comprising a biodegradable base film and an adhesive layer formed on the base film, wherein the surface of the base film is rubbed by a means of rubbing and then the adhesive layer is formed on the thus rubbed surface.

The present invention further provides an adhesive tape comprising a biodegradable base film, a primer layer formed on the base film and an adhesive layer further formed on the primer layer, wherein the surface of the base film is rubbed by a means of rubbing and then the primer layer is formed on the thus rubbed surface.

In these adhesive tapes according to the present invention, the base film has a polylactic acid film the surface of which can be rubbed as described above.

In this case, a biaxially oriented polylactic acid film may be used as the polylactic acid film.

In the adhesive tape according to the present invention, on the other hand, the base film may be provided with a Bionolle film the surface of which can be rubbed as described above.

In the adhesive tapes of the present invention as described above, the adhesive layer may contain as the main component an adhesive which does not deteriorate the biodegradability of the base film.

In this case, a natural rubber can be used as the adhesive.

In the adhesive tape of the present invention as described above, the adhesive layer may contain an opaque filler which does not deteriorate the biodegradability of the base film.

In this case, as the opaque filler, a water-insoluble one can be used.

In the adhesive tape of the present invention as described above, the adhesive layer may contain a coloring agent which does not deteriorate the biodegradability of the base film.

In this case, as the coloring agent, an oil-soluble one can be used.

When the adhesive layer of the adhesive tape as described above contains a polyisoprene rubber, the adhesive layer can contain a phenolic age resistor.

In the adhesive tape as described above, a separate film may be bonded onto the adhesive layer.

In this case, as the separate film, a biodegradable one may be used.

In this case, the separate film comprises a polyvinyl alcohol film.

In the case of an adhesive tape comprising a base film made of a resin, either biodegradable or not, and a rubbery adhesive layer formed on the surface of the base film, on the other hand, the surface of the base film may be rubbed by a means of rubbing and then the rubbery adhesive layer can be formed on the thus rubbed surface.

As a non-biodegradable base film, a polyester film or a polyimide film may be used.

In a process for producing an adhesive tape comprising feeding a base film shaped in a tape in the longitudinal direction, and applying a solution of ingredients of adhesive layer onto the surface of the base film to thereby form an adhesive layer, the surface of the base film is rubbed by a means of rubbing prior to the application of the solution of ingredients of adhesive layer in the present invention.

In this case, the solution of ingredients for adhesive layer may contain an organic compound as a solvent.

In a process for producing an adhesive tape comprising feeding a base film shaped in a tape in the longitudinal direction, applying solution of ingredients of primer layer onto the surface of the base film to thereby form a primer layer and then applying solution of ingredients of adhesive layer onto the surface of the primer layer to thereby form an adhesive layer, the surface of the base film is rubbed by a means of rubbing prior to the application of the solution of ingredients of primer layer in the present invention.

In this case, the solution of ingredients of primer layer may contain an organic compound as a solvent and the solution of ingredients of adhesive layer may contain water as a solvent.

The present invention has the constitution as described above and provides an adhesive tape comprising a biodegradable base film made of a polylactic acid film or a BIONOLLE film and an adhesive layer formed on the base film. The adhesive layer is formed by rubbing the surface of the base film desired times by a means for rubbing and then applying solution of ingredients of adhesive layer directly thereon followed by drying. Alternatively, a primer layer is formed on the rubbed surface and then the adhesive layer is formed on the surface of the primer layer.

In the prior art, only a poor adhesive force is established between a biodegradable film and an adhesive layer. When the surface of a base film is rubbed, the adhesive force between the base film and the adhesive layer can be elevated and thus a biodegradable adhesive tape can be obtained.

An adhesive tape which is biodegradable as a whole can be obtained by using a biodegradable adhesive component (for example, a natural rubber) in the adhesive layer and a biodegradable film (for example, a polyvinyl alcohol film) as the separate film.

When fillers or coloring agents are added to the adhesive layer for opacifying, it is preferable to use additives which do not deteriorate the biodegradability of the adhesive layer.

When solution of ingredients of adhesive layer contains water as a solvent, the adhesive force cannot be elevated merely by rubbing the surface of the base film. When a primer layer is formed by applying solution of ingredients of primer layer containing an organic compound as a solvent on the rubbed surface of the base film, the adhesive force between the base film and the primer layer is elevated. Thus, an adhesive tape can be obtained by forming an adhesive layer on the surface of the primer layer. Since the primer layer may be thinner than the adhesive layer, the amount of the organic solvent required in producing the adhesive tape can be thus reduced.

DETAILED DESCRIPTION OF PREFERRED EMBODIMENTS

First, an embodiment of the process for producing the adhesive tape of the present invention will be described.

Figure 1:
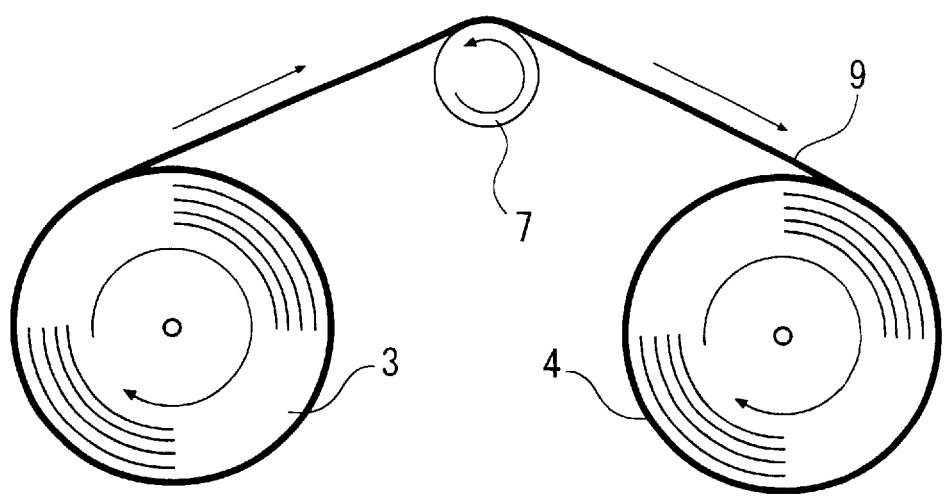
FIG. 1 is a diagram illustrating a process for producing the adhesive tape according to the present invention.

As FIG. 1 shows, a means of rubbing 7 provided with a feed roll 3 around which a polylactic acid film (bi-oriented LACTY™ manufactured by Shimadzu Corporation) has been wound and a soft rubbing cloth (for example, a cotton cloth) located on the surface of the roll is prepared. The polylactic acid film 9 is drawn from the feed roll 3, hung on the rubbing means 7 and then wound with a winding roll 4.

In this step, the rubbing means 7 is rotated in reverse to the polylactic acid film 9 so that the surface of the polylactic acid film 9 is rubbed in a dry atmosphere (ordinary temperature, atmospheric pressure).

Next, the polylactic acid film 9 wound around the winding roll 4 is delivered and transported in a device commonly used for forming an adhesive layer. Thus, solution of ingredients of adhesive layer prepared by dissolving an isoprene rubber-type adhesive (i.e., the main component) in an organic solvent is applied onto the rubbed surface and dried, thus forming an adhesive layer. Subsequently, a polyvinyl alcohol film as a separate film comprising (PVA film) is contact-bonded to the surface of the adhesive layer to thereby give an adhesive tape.

Figure 3:
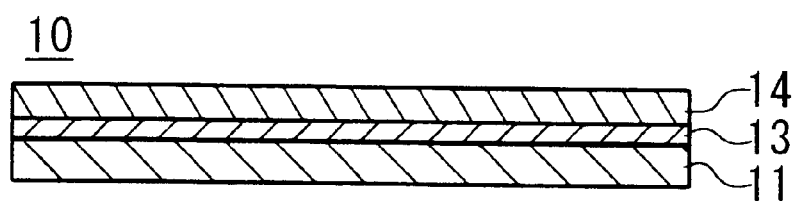
FIG. 3 is a sectional view of an example of the adhesive tape according to the present invention.

FIG. 3 shows the adhesive tape 10 thus obtained which consists of a base film 11 comprising a rubbed polylactic acid film, an adhesive layer 13 formed thereon and a separate film 14 bonded onto the adhesive layer 13. When the adhesive tape 10 is to be used, the separate film 14 is peeled off and the adhesive layer 13 is contact-bonded to an adherend.

When the adhesive force (peel strength) of the above-mentioned adhesive tape 10 is measured, the adhesive force between the adhesive layer 13 and the separation film 14 is 6 g/2 cm (i.e., the load required to peel off the separation film when the width of the adhesive tape is 2 cm), while that between the base film 11 (polylactic acid film) and the adhesive layer 13 is 800 g/2 cm. When the separation film 14 is peeled off and the adhesive layer 13 is adhered to a stainless plate, an adhesive force of 50 g/2 cm is established.

Thus, a sufficiently high adhesive strength is established between the rubbed surface of base film 11 and the adhesive layer 13.

For comparison, the same polylactic acid film as that employed above is not rubbed but used as such as a base film and an adhesive layer is formed thereon. In this case, only a poor adhesive strength (30 g/2 cm) is achieved between the base film and the adhesive layer.

The separation film 14 usable in the adhesive tape 10 according to the present invention is not restricted to the PVA film. Namely, various biodegradable films made of polycaprolactone, polyester, polybutyric acid, etc. are usable therefor.

As the rubbing means 7, clothes made of Japanese paper, carbon fiber, nylon, rayon, etc may be used. Although an effect of improving the adhesive force can be achieved by using a rubbing means made of a hard material, the base film 11 is damaged in this case. When a transparency of the film is required, it is therefore favorable to use a soft cloth such as velvet.

As the adhesive employed for forming the adhesive layer 13, various rubbery adhesives such as synthetic isoprene rubber, nitrile rubber and SBR rubber, in addition to natural isoprene rubber may be used. From the viewpoint of biodegradability, it is preferable to use natural isoprene rubber or synthetic isoprene rubber therefor.

To further illustrate the present invention in greater detail, the following Examples will be given.

EXAMPLE 1

First, a synthetic isoprene rubber (IR-10 manufactured by Kuraray Co., Ltd.) was dissolved in toluene to give solution of ingredients of adhesive layer with a solid content of 10%.

Next, the surface of a base film comprising a polylactic acid film is rubbed 10 times with a rubbing means provided with a cotton cloth in such a manner as not to damage the surface (rubbing treatment) and then the solution of ingredients of adhesive layer was casted over the thus rubbed surface of the base film. After drying at 80° C. for 5 minutes so as to evaporate the toluene, an adhesive layer, such as an isoprene layer, of 10 μm in thickness was obtained.

Subsequently, the base film having the adhesive layer formed thereon was halved and the adhesive layers of the obtained pieces were bonded to each other, thus giving a sample film.

When measured, this sample film showed a self-adhesive force of 800 g/2 cm. The failure face suffered from the cohesive failure of the isoprene rubber.

Next, sample sheets were prepared under the same conditions as those described above but varying the rubbing number and the self-adhesive force was measured. Table 1 summarizes the results.

TABLE 1

Relationship between rubbing number and self-adhesive force

| Number of rubbing | Self-adhesive force (g/2 cm) |
|---|---|
| 1 | 250 |
| 2 | 350 |
| 3 | 400 |
| 4 | 500 |
| 5 | 800 |
| 6 | 800 |
| 7 | 800 |
| 9 | 800 |

Next, sample sheets were prepared under the same conditions as those described above but varying the rubbing number and the self-adhesive force was measured. Table 1 summarizes the results.

Table 1 shows that the adhesive force can be effectively improved by rubbing with a cotton cloth 5 times or more.

Comparative Example 1

A sample film was prepared in the same manner as that of Example 1 but omitting the rubbing treatment. When measured, the obtained sample showed a self-adhesive force of 30 g/2 cm. The separation occurred at the interface of the base film and the adhesive layer.

Comparative Example 2

A sample film was prepared under the same conditions as those of Example 1 but the surface of the base film was subjected to corona discharge instead of the rubbing treatment. The obtained sample showed a self-adhesive force of 50 g/2 cm. Although the self-adhesive force was elevated compared with that of Comparative Example 1, the separation occurred at the interface of the base film and the adhesive layer.

A sample film was prepared under the same conditions as those of Example 1 but the surface of the base film was subjected to UV-irradiation instead of the rubbing treatment. The obtained sample showed a self-adhesive force of 30 g/2 cm, i.e., comparable that of Comparative Example 1. The separation also occurred at the interface of the base film and the adhesive layer.

EXAMPLE 2a

A nitrile rubber (NIPOL 1042 manufactured by Nippon Zeon Co., Ltd.) was masticated and then dissolved in methyl ethyl ketone (MEK) to give solution of ingredients of adhesive layer.

A bi-oriented polyester film of 50 μm in thickness was employed as a base film and the surface thereof was rubbed with steel wool 10 times. Then, the solution of ingredients of adhesive layer was applied onto the rubbed surface and dried to thereby form an adhesive layer. By using this adhesive tape, a sample film was prepared in the same manner as that of Example 1 (i.e., bonding the adhesive layers to each other) and its self-adhesive force was measured. As a result, the obtained sample film showed an adhesive strength of 3000 g/2 cm.

EXAMPLE 2b

A natural rubber was dissolved in toluene to give solution of ingredients of adhesive layer. A biaxially oriented polylactic acid film of 50 μm in thickness was employed as a base film and the surface thereof was rubbed with ben cotton 10 times. Then, the solution of ingredients of adhesive layer was applied onto the rubbed surface and dried. When measured in the same manner as that of Example 1, the obtained sample film showed an adhesive strength of 1000 g/2 cm.

EXAMPLE 2c

A block SIS rubber (TR1107 manufactured by Shell) was dissolved in toluene to give solution of ingredients of adhesive layer. A polyimide film of 50 μm in thickness was employed as a base film and the surface thereof was rubbed with a nylon brush 10 times. Then, the solution of ingredients of adhesive layer was applied onto the rubbed surface and dried. When measured under the same conditions as those of Example 1, the obtained sample film showed an adhesive strength of 600 g/2 cm.

Comparative Example 3

Adhesive tapes were produced under the same conditions as those of Examples 2a to 2c but not rubbing the surface of the base films and then the self-adhesive force of each sample was measured. As a result, the adhesive tapes corresponding to Examples 2a, 2b and 2c respectively showed adhesive strengths of 900 g/2 cm, 30 g/2 cm and 10 g/2 cm. In each case, separation occurred at the adhesive layer/base film interface.

By rubbing the surface of the base film, the film surface underwent orientation and, as a result, the adhesive applied thereon was also oriented. Compared with the case where the rubbing treatment was omitted, the adhesive strength could be thus elevated by thrice or more.

When an adhesive tape consisting of a rubbery adhesive layer and a base film is prepared as in this Comparative Example 3, it is necessary in the prior art to form a primer layer because of the poor adhesive strength between the adhesive layer and the base film. According to the present invention, in contrast, the adhesive strength can be improved merely by rubbing.

Comparative Example 4

Figure 2:
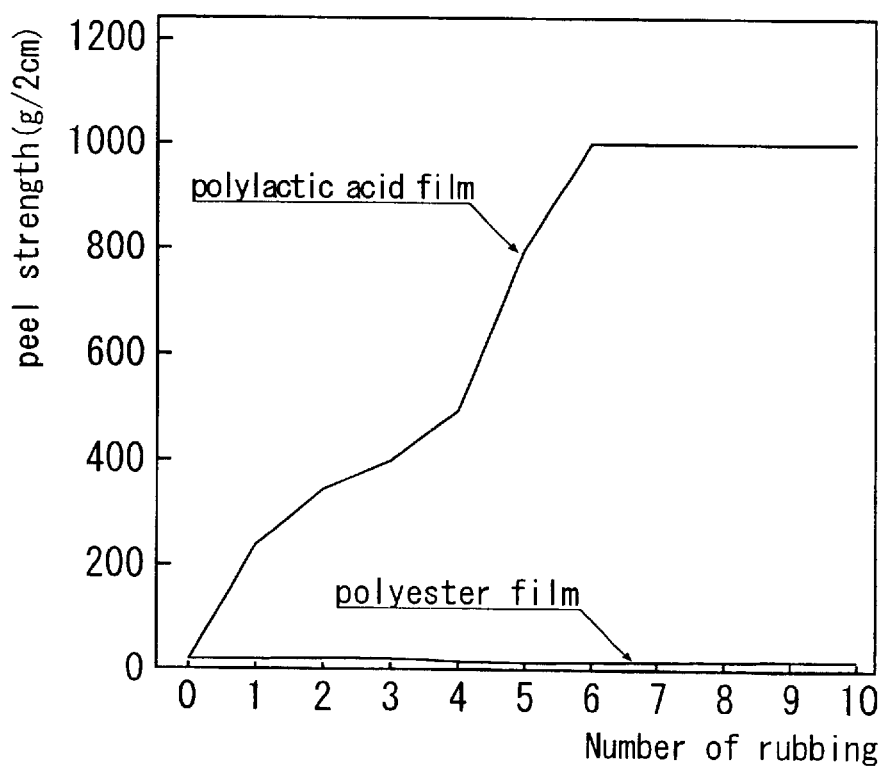
FIG. 2 is a graph showing the relationship between the rubbing number and peel strength.

A sample film was prepared by the same method as that of Example 1 but using a polyester film as a substitute for the polylactic acid film serving as the base film and rubbing the surface thereof with a means of rubbing provided with ben cotton. Then the self-adhesive force of the obtained sample was measured. FIG. 2 is a graph showing the data thus obtained as well as the data of the polylactic acid film.

When the polyester film was employed as the base film, no effect of improving the adhesive force was achieved by the surface-rubbing treatment. In the case where the base film was the polylactic acid film, however, a remarkable effect was achieved.

EXAMPLE 3

A sample film was prepared under the same conditions as those of Example 1 but rubbing the surface of the base film comprising a polylactic acid film with a means of rubbing provided with a buff, such as a nylon brush, i.e., buffing. Then the self-adhesive force of the obtained sample was measured. The buffing was carried out under a pressure of 1 kg/cm at a speed of 4 ml/min without using any abrasive. The test film thus obtained showed an adhesive force of 1000 g/2 cm. Namely, the buffing treatment was superior in the effect of improving the adhesive force to the rubbing treatment with the use of a cotton cloth.

Next, adhesive tapes with the use of rubbed base films which can be obtained by using organic solvents in a reduced amount will be described.

EXAMPLE 4

The surface of a base film comprising a polylactic acid film was rubbed 10 times with a rubbing means provided with a cotton cloth in such a manner as not to damage the surface. Then solution of ingredients of primer layer which is a 5% solution of a natural rubber (RSS1) in toluene was applied onto the rubbed surface and dried to give a primer layer of 1 $\mu$m in thickness.

Figure 4:
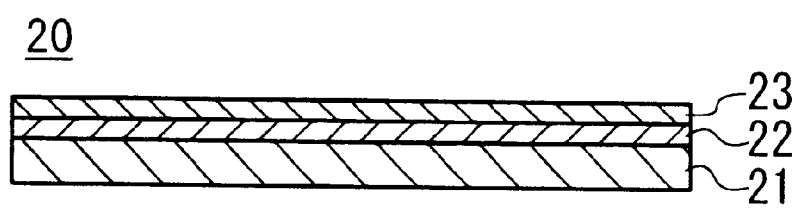
FIG. 4 is a sectional view of another example of the adhesive tape according to the present invention.

Further, a natural rubber latex (the term "latex" as used herein means a suspension of a natural or synthetic rubber or plastic in water), which was employed as solution of ingredients of adhesive layer, was applied on the primer layer and dried to give an adhesive layer of 10 $\mu$m in thickness. Numeral 20 of FIG. 4 shows the thus obtained adhesive tape wherein a primer layer 22 and an adhesive layer 23 are laminated on a base film 21.

Subsequently, the adhesive tape 20 was halved and the adhesive layers 23 of the obtained pieces were bonded to each other, thus giving a sample tape. Then the self-adhesive force of the sample tape was measured. Also, the obtained adhesive tape was adhered to a stainless (SUS) plate and the adhesive force thereto was measured.

Comparative Example 5

On the rubbed base film 21 employed in Example 4, no primer layer was formed but the same natural rubber latex as that employed in Example 4 was directly applied and dried to form an adhesive layer of 10 $\mu$m in thickness, thus giving an adhesive tape. This adhesive tape was evaluated in the self-adhesive force and the adhesive force to a stainless plate as in Example 4.

Comparative Example 6

On the rubbed base film 21 employed in Example 4, a 5% solution of a natural rubber (RSS1) in toluene, which was used for forming the primer layer in Example 3, was applied and dried to form an adhesive layer of 10 $\mu$m in thickness, thus giving an adhesive tape. This adhesive tape was also evaluated in the self-adhesive force and the adhesive force to a stainless plate.

Comparative Example 7

On an unrubbed polylactic acid film, a primer layer and an adhesive layer were laminated in the same manner as that of Example 4. The obtained adhesive tape was also evaluated in the self-adhesive force and the adhesive force to a stainless plate.

Results of Measurement

Table 2 summarizes the results of the measurement in Example 4 and Comparative Examples 5, and 6.

TABLE 2

| Adhesive tapes with the use of natural rubber latex | | | |
|---|---|---|---|
| | Self-adhesive force (g/2 cm) | Adhesive force to SUS (g/2 cm) | Separation part |
| Ex.4 | 500 | 20 | adhesive face |
| Comp. Ex. 5 | 40 | 20 | polylactic acid film face |
| Comp. Ex. 6 | 1000 | 30 | adhesive face |
| Comp. Ex. 7 | 30 | 20 | polylactic acid film face |

With respect to the separation parts, separation occurred at the adhesive face in the sample of Example 4 but between the base film and the adhesive layer in the sample of Comparative Example 5. In the sample of Comparative Example 7, separation occurred between the base film and the primer layer.

As the data of Comparative Example 7 given in the above Table 2 show, the adhesive force to the base film could not be improved unless the rubbing treatment was performed. The data of Comparative Example 5 show that the adhesive force could not be improved by applying the natural rubber latex onto the rubbed surface of the base film.

On the other hand, the data of Example 4 and Comparative Example 6 indicate that, in case of the natural rubber (RSS1), effects of rubbing treatment of base film is excellent.

However, a comparison between Example 4 and Comparative Example 6 suggests that 190 g/m$^2$ of toluene was employed in forming the adhesive layer (10 $\mu$m) in Comparative Example 6, while 19 g/m2 of toluene was employed in forming the primer layer 22 (1 $\mu$m) in Example 4. That is to say, only 1/10 times as much toluene was needed in Example 4.

Since there is a worldwide tendency to regulate the discharge of organic solvents into the atmosphere, it is desirable to minimize the amount of organic solvents employed. When the natural rubber latex is applied directly to form the adhesive layer without using any organic solvent, the rubbing treatment can establish only a poor effect, as in Comparative Example 5. However, it has been clarified that a favorable result can be obtained with the use of an organic solvent in only a small amount, by forming a thin primer layer between the adhesive layer and the base film as in Example 4.

Next, adhesive tapes with the use of biaxially oriented polylactic acid films will be described.

EXAMPLE 5

A biaxially oriented polylactic acid film of 40 $\mu$m in thickness was employed as a base film and the surface thereof was rubbed in the same manner as that of Example 1. Next, a solution containing 6 parts by weight of a natural rubber, 4 parts by weight of a natural rosin and 90 parts by weight of toluene was applied onto the thus rubbed surface and dried to form an adhesive layer of 30 $\mu$m in thickness, thus giving an adhesive tape.

Next, the adhesive force between the adhesive layer and the base film of this tape, the adhesive force of this tape to a stainless plate to which it was adhered, the film tensile strength and the film elongation were measured.

Comparative Example 8

An adhesive tape was prepared under the same conditions as those of Example 5 but omitting the rubbing treatment. The obtained tape was evaluated as in Example 5.

Results of Measurement

The following Table 3 shows the results of the measurement of Example 5 and Comparative Example 8 together with the data of a marketed product 1 (a PP packing tape manufactured by Nitto Denko Corporation).

TABLE 3

Adhesive tapes with the use of biaxially oriented polylactic acid film

|  | Ex. 5 | Comp. Ex. 8 | Marketed product 1 |
| --- | --- | --- | --- |
| Adhesive force to SUS (g/2 cm) | 500 | 500 | 500 |
| Adhesive force to base film (g/2 cm) | 1000 | 500 | measurement impossible |
| Film tensile strength (kg) | 5 | 5 | 11.5 |
| Film elongation (%) | 260 | 260 | 300 |

Marketed product 1: PP packing tape manufactured by Nitto Denko Corporation.

In Comparative Example 8, the adhesive force of the adhesive layer to the base film was as large as that to the adherend (i.e., the stainless plate). Therefore, when this adhesive tape is adhered to an adherend, it is feared that the adhesive might transfer to the adherend as the adhesive tape is peeled off.

In Example 5, in contrast thereto, the adhesive force of the adhesive layer to the rubbed surface of the base film exceeded the adhesive force to the stainless plate. In this case, there is no fear of the transfer of the adhesive to an adherend.

As discussed above, the present invention makes it possible to produce an adhesive tape having biodegradability as a whole by rubbing a biaxially oriented polylactic acid film. This adhesive tape can be shaped in a roll and employed as a packing tape, etc.

Next, the color of adhesive tapes will be described.

Adhesive tapes with the use of a mono-oriented polylactic acid film having an adhesive layer of 50 μm or less in thickness are transparent, which brings about a problem that they would assimilate into the color of substrates thus making the adhesion sites unclear. It is therefore necessary to produce opaque adhesive tapes.

EXAMPLE 6 parts by weight of a natural rubber and 0.6 parts by weight of calcium carbonate were dissolved in 93.4 parts by weight of toluene. The obtained solution was applied onto the surface of a biaxially oriented polylactic acid film of 40 μm in thickness having been rubbed in the same manner as that of Example 1 and dried to form an adhesive layer of 10 μm in thickness. Thus an adhesive tape was prepared.

The natural rubber and the calcium carbonate served respectively as an adhesive and an opaque filler.

Comparative Example 9

An adhesive tape was prepared under the same conditions as those of Example 1 but omitting the rubbing treatment and the adhesive force of the obtained adhesive tape was measured.

Comparative Example 10

An adhesive tape was prepared under the same conditions as those of Example 6 but using no calcium carbonate and the adhesive force of the obtained product was measured.

Results of Measurement

These adhesive tapes were evaluated in the adhesive force between the base film and the adhesive layer, the adhesive force of the adhesive tape to a stainless plate to which it was adhered, transmittance and biodegradability.

Table 4 summarizes the results.

TABLE 4

Adhesive tapes containing calcium carbonate

|  | Ex. 6 | Comp. Ex. 9 | Comp. Ex. 10 |
| --- | --- | --- | --- |
| Adhesive force to SUS (g/2 cm) | 30 | 30 | 30 |
| Adhesive force to base film (g/2 cm) | 1000 | 30 | 1000 |
| Transmittance (%) | 0 | 0 | 90 |
| Biodegradability | yes | yes | yes |

As Example 6 shows, the rubbing treatment contributed to the improvement in the adhesive force even though the adhesive layer contained the opaque filler (i.e., calcium carbonate). Since thus obtained adhesive tape has a transmittance of 0, the color of a substrate can be completely shielded and thus the adhesion sites can be easily recognized. The addition of the opaque filler (i.e., calcium carbonate) never deteriorates the biodegradability.

On the other hand, the adhesive tape of Comparative Example 9 not having been rubbed showed a low adhesion force, which brings about a fear of transfer. The adhesive tape of Comparative Example 10 showed a high transmittance, which makes the recognition at adhesion sites difficult.

Because of originating in organisms (i.e., shells), calcium carbonate is favorable as an opaque filler. However, the present invention is not restricted thereto.

Namely, use can be also made of water-insoluble opaque materials having a neutral pH value such as aluminum oxide therefor.

In the above Example 6, the adhesive tape was made opaque by adding an additive to the adhesive layer. It is also possible to color an adhesive tape to thereby distinguish it from a substrate. In such a case, it is required to add a biodegradable coloring agent so as not to deteriorate the biodegradability of the polylactic acid film.

EXAMPLE 7

5 parts by weight of a natural rubber and 0.05 parts by weight of chlorophyll were dissolved in 94.95 parts by weight of toluene. The obtained solution was applied onto the surface of a polylactic acid film having been rubbed in the same manner as that of Example 1 and dried to form an adhesive layer of 10 μm in thickness. Thus an adhesive tape was prepared.

The obtained adhesive tape showed an adhesive force comparable to that containing no coloring agent. Moreover, the biodegradability thereof was not deteriorated.

Since chlorophyll was soluble in oil, the coloring matter was not bled when this adhesive tape was allowed to stand in water. Thus, it was highly usable in practice.

EXAMPLE 8

An adhesive tape was prepared under the same conditions as those of Example 7 but using carotene (oil-soluble) as a substitute for the chlorophyll. The obtained adhesive tape showed an adhesive force comparable to that of Example 7 and the biodegradability thereof was not deteriorated. When the adhesive tape was allowed to stand in water, the coloring agent was not bled into the water.

Comparative Example 11

An adhesive tape was prepared under the same conditions as those of Example 7 but using Food Dye Blue No. 1 as a substitute for the chlorophyll. Since Food Dye Blue No. 1 was soluble in water, the coloring agent was bled when the adhesive tape was allowed to stand in water. The same phenomenon was observed when Food Dye Blue No. 2 was employed as a substitute for Food Dye Blue No. 1.

Comparative Example 12

An adhesive tape was prepared under the same conditions as those of Example 7 but using Aizen Spilon green GNH (oil-soluble dye which is not food additive) as a substitute for the chlorophyll. Although the coloring agent was not bled when the adhesive tape was allowed to stand in water, the applied face did not undergo biodegradation.

Next, the calcium carbonate employed in Example 6 was added to an adhesive layer as an opaque filler together with a coloring agent.

EXAMPLE 9

5 parts by weight of a natural rubber, 0.05 parts by weight of copper chlorophyll and 0.5 parts by weight of calcium carbonate were dissolved in toluene. The obtained solution was applied onto the surface of a polylactic acid film having been rubbed in the same manner as that of Example 1 and dried to form an adhesive layer of 20 μm in thickness. Thus an adhesive tape was prepared.

Comparative Example 13

An adhesive tape was prepared under the same conditions as those of Example 9 but omitting the rubbing treatment.

Comparative Example 14

An adhesive tape was prepared under the same conditions as those of Example 9 but using Aizen Spilon Green GNH (oil-soluble dye which is not food additive) as a substitute for the copper chlorophyll compound which is a food additive.

Comparative Example 15

An adhesive tape was prepared under the same conditions as those of Example 9 but using Food Dye Blue No. 1 (soluble in water) as a substitute for the copper chlorophyll compound.

Results of Evaluation

These adhesive tapes were evaluated in the adhesive force between the adhesive layer and the base film, and the adhesive force between the adhesive layer and the back face of the base film to which the adhesive tape was adhered. Also, the solubility of the coloring agent in water and biodegradability were evaluated. Table 5 summarizes the results.

TABLE 5

Adhesive tapes containing calcium carbonate and coloring agent

|  | Ex. 10 | Comp. Ex. 16 | Comp. Ex. 17 | Comp. Ex. 18 |
| --- | --- | --- | --- | --- |
| Adhesive force to rubbed face (g/2 cm) | 1000 | 30 | 1000 | 1000 |
| Adhesive force to back face of base film (g/2 cm) | 30 | 30 | 30 | 30 |
| Elution into water | no | no | no | water colored |
| Biodegradability | yes | yes | * | yes |

* Biodegradation not proceeded on the applied face alone.

As Table 5 shows, a poor adhesive force was achieved to the unrubbed back face of the base film, while a strong adhesive force was established to the rubbed surface of the base film regardless of the addition of the coloring agent and the opaque filler to the adhesive layer.

To produce a biodegradable adhesive tape, a polyisoprene rubber, such as a natural rubber, can be used as an adhesive.

However, the polyisoprene rubber has a disadvantage that it would be deteriorated due to the absorption of oxygen. When the adhesive face is exposed to air, for example, the surface is first sticky but hardened finally, thus losing the adhesiveness. Neither a sticky surface nor a hardened one is favorable as an adhesive tape.

To improve the surface stability of the polyisoprene rubber, it is therefore necessary to add age resistors, such as antioxidants, heat-resistant age resistors, vulcanization accelerators, etc.

EXAMPLES 11 to 18

Adhesive tapes were prepared in the same manner as that of Example 1 but adding one or two age resistors authorized by FDA to the polyisoprene rubber solution.

Based on 100 parts by weight of the polyisoprene rubber, 1 part by weight of a phenolic age resistor A and 0 or 0.5 parts by weight of a non-phenolic age resistor B were added.

As the phenolic age resistor A, NOCRAC NS30 (4,4'-butylidene-bis-(3-methyl-6-ter-butylphenol)) or NOCRAC PBK were used. As the non-phenolic age resistor B, use was made of a phosphorus-type NOCRAC TNP (tris(nonyl phenyl)phosphite), an imidazole-type NOCRAC MBZ (zinc salt of 2-mercaptobenzimidadzole) or a dithiocarbamic acid-type NOCCELER BZ (zinc di-n-butyl dithiocarbamate) each manufactured by Ouchi Shinko Kagaku K.K. Table 6 shows the age resistors A and B employed in Examples 11 to 18.

TABLE 6

Age resistors added

|  | Age resistor A | Age resistor B |
| --- | --- | --- |
| Ex. 11 | NOCRAC 30 | no |
| Ex. 12 | NOCRAC 30 | NOCRAC MBZ |
| Ex. 13 | NOCRAC 30 | NOCRAC TNP |
| Ex. 14 | NOCRAC 30 | NOCCELER BZ |
| Ex. 15 | NOCRAC PBK | |
| Ex. 16 | NOCRAC PBK | NOCRAC MBZ |
| Ex. 17 | NOCRAC PBK | NOCRAC TNP |
| Ex. 18 | NOCRAC PBK | NOCCELER BZ |

TABLE 6-continued

| | Age resistors added | |
|---|---|---|
| | Age resistor A | Age resistor B |
| Comp. Ex. 19 | not added | |
| Comp. Ex. 20 | NOCRAC CD (amine type) | |
| Comp. Ex. 21 | NOCRAC 630F (amine type) | |

Comparative Examples 19 to 21

For comparison, an adhesive tape free from any age resistor (Comparative Example 19) and those containing an amine-type age resistor NOCRAC CD (Comparative Example 20) or NOCRAC 630F (Comparative Example 21), each manufactured by Ouchi Shinko Kagaku K.K., were prepared. The age resistors employed are also shown in Table 6.

Results of Measurement

Each adhesive tape was stored in a thermostat at 60° C. with the adhesive face upward and the adhesive force was examined by the finger test. After 6 days, the tape was taken out from the thermostat and the self-adhesive strength (the adhesive force between the rubbed face of the base film and the adhesive layer) and the biodegradability were evaluated.

Table 7 shows the results of the evaluation of the surface conditions with the passage of time, the results of the measurement of the adhesive force between the adhesive layer and the base film of the adhesive tape, and the results of the evaluation of the biodegradability.

TABLE 7

| | Results of evaluation and measurement | | | | | | | |
|---|---|---|---|---|---|---|---|---|
| | Storage (day) | | | | | | Adhesion force to base | Biodegrad- |
| | 1 | 2 | 3 | 4 | 5 | 6 | film (g/2 cm) | ability |
| Ex. 11 | o | o | o | o | o | o | 1000 | yes |
| Ex. 12 | o | o | o | o | o | o | 1000 | yes |
| Ex. 13 | o | o | o | o | o | o | 1000 | yes |
| Ex. 14 | o | o | o | o | o | o | 1000 | yes |
| Ex. 15 | o | o | o | o | o | o | 1000 | yes |
| Ex. 16 | o | o | o | o | o | o | 1000 | yes |
| Ex. 17 | o | o | o | o | o | o | 1000 | yes |
| Ex. 18 | o | o | o | o | o | o | 1000 | yes |
| Comp. Ex. 19 | x | x | * | x | x | * | 1000 | yes |
| Comp. Ex. 20 | o | x | x | x | x | * | 1000 | no |
| Comp. Ex. 21 | o | o | o | x | x | x | 1000 | no | o: No change.
x: Sticky.
*: Loss in adhesiveness.

As the above Table 7 shows, the polyisoprene rubber showed an excellent adhesiveness to the rubbed surface of the base film regardless of the addition of the age resistors thereto.

When the phenolic age resistors were used, the aging of the adhesive layer could be prevented and the surface was stabilized. On the other hand, the amine-type age resistors could sustain the age-resistant effect only for 3 days at the longest.

Although phenolic, phosphorus-type, imidazole-type and dithiocarbamic acid type age resistors would not deteriorate the biodegradability, the amine-type age resistors deteriorated the biodegradability.

As the base film of the adhesive tape according to the present invention, use may be widely made of biodegradable films having rubbed surface in addition to the polylactic acid film. As an example of an adhesive tape with the use of a biodegradable film other than the polylactic acid film, one having a BIONOLLE film will be described.

BIONOLLE is a high-molecular weight aliphatic polyester having biodegradability which is obtained by polycondensing a glycol such as 1,4-butanediol with an aliphatic dicarboxylic acid such as succinic acid or adipic acid.

The molecular structure thereof is represented by the following chemical formula.

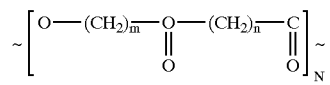

BIONOLLE films are divided into two types, i.e., polybutylene succinate (PBS) and polybutylene succinate adipate (PBSA) depending on the combination of m and n in the above chemical formula.

The following Table 8 shows a comparison in physical properties of the BIONOLLE films (PBS and PBSA) with commonly employed resins.

TABLE 8

Properties of BIONOLLE films manufactured by Showa High Polymer Co., Ltd.

| Compound | PBS | | PBSA | | Common resin (comparison) | | |
| --- | --- | --- | --- | --- | --- | --- | --- |
| | | | | | PP | High density polyethylene | High density polyethylene |
| Grade | #1001 | #1020 | #3001 | #3020 | | | |
| Density (g/cm$^3$) | 1.26 | 1.26 | 1.23 | 1.23 | 0.90 | 0.95 | 0.92 |
| Melting point. (° C.) | 114 | 115 | 94 | 95 | 165 | 130 | 108 |
| Glass transition temp. (° C.) | −32 | −32 | −45 | −45 | −5 | −120 | −120 |
| Crystallization temp. (° C.) | 75 | 75 | 50 | 50 | 120 | 104 | 80 |
| Mass-average molecular weight (x10$^4$) | 22 | 15 | 22 | 15 | — | — | — |
| Tensile strength (Mpa \|kgf/cm$^2$\|) | 56.8 \|580\| | 20.6 \|210\| | 44.1 \|450\| | 35.3 \|360\| | 49.0 \|500\| | 39.2 \|400\| | 29.4 \|300\| |
| Tensile elongation (%) | 600 | 320 | 800 | 450 | 800 | 700 | 800 |
| Flexural modulus of elasticity (Mpa \|kgf/cm$^2$\|) | 657 \|6700\| | 686 \|7000\| | 323 \|3300\| | 343 \|3500\| | 1370 \|14000\| | 1080 \|11000\| | 196 \|2000\| |
| Heat of combustion (KJ/g \|cal/g\|) | 23.6 \|5640\| | | 23.9 \|5720\| | | 44.0 \|10500\| | 46.0 \|11000\| | |
| Degree of crystallization (mass %) | 30~45 | | 20~30 | | 50 | 75 | 30~40 |

PBS: polybutylene succinate.
PBSA: polybutylene succinate adipate.

As Table 8 shows, BIONOLLE films are excellent in tensile elongation, elasticity and flexibility. These characteristics make them suitable for films, sheets, nonwoven fabrics, etc. which should be flexible.

EXAMPLE 19

A BIONOLLE film of 40 μm in thickness was employed as a base film. After rubbing the surface of the base film in the same manner as that of Example 1, a solution of 5 parts by weight of a natural rubber and 1 part by weight of a natural rosin in 94 parts by weight of toluene was applied onto the surface and dried, thus forming an adhesive layer of 20 μm in thickness. Thus, an adhesive tape was obtained.

This adhesive tape was evaluated in the adhesive force between the adhesive layer and the base film, the adhesive force of the adhesive tape to a stainless plate to which it was adhered, the film tensile strength and the film elongation.

Comparative Example 22

An adhesive tape was prepared under the same conditions as those of Example 19 but not rubbing the BIONOLLE film and then evaluated as in Example 19.

Results of Measurement

Table 9 shows the results of the measurement.

TABLE 9

Adhesive tapes with the use of BIONOLLE film

| | Ex. 19 | Comp. Ex. 22 | Marketed product 2 |
| --- | --- | --- | --- |
| Adhesive force to SUS (g/2 cm) | 70 | 70 | 70 |
| Adhesive force to base film (g/2 cm) | 200 | 70 | measurement impossible |
| Film tensile strength (kg) | 2.7 | 2.7 | 2.8 |
| Film elongation (%) | 700 | 700 | 500 |

Marketed product 2: vinyl chloride protect tape manufactured by Nitto Denko Corporation.

In the case of Comparative Example 22, only a poor adhesive force was achieved between the base film and the adhesive layer. It is therefore feared that when the adhesive tape is peeled off from an adherend, the adhesive might transfer onto the adherend. The adhesive tape of Example 19 is free from such a problem.

As described above, the present invention makes it possible to obtain a flexible and biodegradable adhesive tape. Since the natural rubber and rosin are biodegradable per se, it is possible to obtain an adhesive tape which is biodegradable as a whole.

A flexible adhesive tape is appropriate as a protect tape for drawing. Although it has been a practice to use soft vinyl chloride film tapes as protective tapes, use of biodegradable adhesive tapes makes it possible to solve the problems of disposal and the evolution of dioxin in incineration.

In the above Examples, either a polylactic acid film or a BIONOLLE film was used as the base film. However, adhesive tapes wherein two or more biodegradable films are laminated also fall within the scope of the present invention.

Industrial Applicability

Since the adhesive tape according to the present invention has an elevated adhesive force between the base film and the adhesive layer, the adhesive layer would not be separated from the surface of the base film.

The adhesive tape of the present invention has a biodegradable base film, which facilitates the disposal thereof.

When a flexible adhesive tape is employed in tying up foods such as vegetables, it can be disposed together with scraps of vegetables in a vegetable store, etc. The adhesive tape of the present invention having a BIONOLLE film as a base film is excellent in flexibility and elongation, which makes it suitable as a protect tape for drawing. It is also usable as a packing tape.

What is claimed is:

1. An adhesive tape comprising a biodegradable base film and an adhesive layer formed on said base film, wherein said base film has a rubbed surface portion, produced by rubbing a surface of the base film to orient the surface of the base film with a rubbing means, and said adhesive layer is formed on the rubbed surface wherein the adhesive layer adheres to the base film with an adhesive force sufficient to prevent transfer of the adhesive layer from the base film.

2. The adhesive tape of claim 1, wherein said base film is a polylactic acid film.

3. The adhesive tape of claim 2, wherein said polylactic acid film is a biaxially oriented polylactic acid film.

4. The adhesive tape of claim 1, wherein said base film comprises an aliphatic polyester resin.

5. The adhesive tape of claim 1, wherein said adhesive layer contains as the main component an adhesive which does not deteriorate the biodegradability of said base film.

6. The adhesive tape of claim 5, wherein said adhesive is a natural rubber.

7. The adhesive tape of claim 1, wherein said adhesive layer contains an opaque filler which does not deteriorate the biodegradability of said base film.

8. The adhesive tape of claim 7, wherein said adhesive is a water-insoluble adhesive.

9. The adhesive tape of claim 1, wherein said adhesive layer contains a coloring agent which does not deteriorate the biodegradability of said base film.

10. The adhesive tape of claim 9, wherein said coloring agent is an oil-soluble coloring agent.

11. The adhesive tape of claim 1 having said adhesive layer containing a polyisoprene rubber, wherein said adhesive layer contains a phenolic age resistor.

12. The adhesive layer of claim 1, wherein a separate film is bonded onto said adhesive layer.

13. The adhesive tape of claim 12, wherein said separate film is a biodegradable film.

14. The adhesive tape of claim 13, wherein said separate film comprises a polyvinyl alcohol film.

15. An adhesive tape comprising a biodegradable base film, a primer layer formed on said base film and an adhesive layer formed on said primer layer, wherein said base film has a rubbed surface portion, produced by rubbing a surface of the base film to orient the surface of the base film with a rubbing means, and said primer layer is formed on the rubbed surface wherein the adhesive layer adheres to the base film with an adhesive force sufficient to prevent transfer of the adhesive layer from the base film.

16. An adhesive tape comprising a base film made of a resin and a rubbery adhesive layer formed on the surface of said base film, wherein said base film has a rubbed surface portion produced by rubbing the surface of the base film to orient the surface of the base film with a rubbing means and said rubbery adhesive layer is formed on the thus rubbed surface wherein the rubbery adhesive layer adheres to the base film with an adhesive force sufficient to prevent transfer of the rubbery adhesive layer from the base film.

17. The adhesive tape of claim 16, wherein a polyester film or a polyimide film is used as said base film.

18. A process for producing an adhesive tape comprising feeding a base film shaped in a tape in the longitudinal direction, rubbing a surface of the base film with a rubbing means to orient the surface of the base film and applying solution of ingredients of adhesive layer onto the rubbed surface of said biodegradable base film to thereby form an adhesive layer wherein the adhesive layer adheres to the base film with an adhesive force sufficient to prevent transfer of the adhesive layer from the base film.

19. The process for producing an adhesive tape of claim 18, wherein said solution of ingredients for adhesive layer contains an organic compound as a solvent.

20. A process for producing an adhesive tape comprising feeding a biodegradable base film shaped in a tape in the longitudinal direction, applying solution of ingredients of primer layer onto the surface of said base film to thereby form a primer layer and then applying solution of ingredients of adhesive layer onto the surface of said primer layer to thereby form an adhesive layer, wherein the surface of said base film is rubbed by a means of rubbing prior to the application of said solution of ingredients of primer layer wherein the adhesive layer adheres to the base film with an adhesive force sufficient to prevent transfer of the adhesive layer from the base film.

21. The process for producing an adhesive tape of claim 20, wherein said solution of ingredients of primer layer contains an organic compound as a solvent and said solution of ingredients of adhesive layer contains water as a solvent.

* * * * *

UNITED STATES PATENT AND TRADEMARK OFFICE
CERTIFICATE OF CORRECTION

PATENT NO. : 6,534,172 B1
DATED : March 18, 2003
INVENTOR(S) : Tadasu Kawashima

It is certified that error appears in the above-identified patent and that said Letters Patent is hereby corrected as shown below:

<u>Title page, Item [54] and Column 1, line 1,</u>
Title, change "PRESSURE-SENSITIVE ADHESIVE TAPE" to -- ADHESIVE TAPE --;

<u>Title page,</u>
Item [75], Inventor, change "Tochiga" to -- Tochigi --.

Signed and Sealed this

Twenty-ninth Day of July, 2003

JAMES E. ROGAN
*Director of the United States Patent and Trademark Office*